United States Patent
Grafton

(10) Patent No.: US 9,268,970 B2
(45) Date of Patent: Feb. 23, 2016

(54) SYSTEM AND METHOD FOR SECURITY-AWARE MASTER

(71) Applicant: ANALOG DEVICES, INC., Norwood, MA (US)

(72) Inventor: Richard F. Grafton, Abington, MA (US)

(73) Assignee: ANALOG DEVICES, INC., Norwood, MA (US)

( * ) Notice: Subject to any disclaimer, the term of this patent is extended or adjusted under 35 U.S.C. 154(b) by 0 days.

(21) Appl. No.: 14/220,992

(22) Filed: Mar. 20, 2014

(65) Prior Publication Data

US 2015/0269396 A1    Sep. 24, 2015

(51) Int. Cl.
*G06F 21/70* (2013.01)

(52) U.S. Cl.
CPC .................................... *G06F 21/70* (2013.01)

(58) Field of Classification Search
CPC ........................................................ G06F 21/70
USPC ............................................................. 726/2
See application file for complete search history.

(56) References Cited

U.S. PATENT DOCUMENTS

| | | | |
|---|---|---|---|
| 6,853,292 B1 | 2/2005 | Kramer et al. | |
| 7,019,639 B2 | 3/2006 | Stilp | |
| 7,185,159 B2 | 2/2007 | Beinet et al. | |
| 7,370,210 B2 * | 5/2008 | Symes | 713/189 |
| 7,412,579 B2 | 8/2008 | O'Connor et al. | |
| 7,434,264 B2 | 10/2008 | Moyer et al. | |
| 7,444,668 B2 | 10/2008 | Moyer et al. | |
| 8,051,467 B2 * | 11/2011 | Renno | 726/4 |
| 8,443,423 B2 | 5/2013 | Renno | |
| 8,448,239 B2 | 5/2013 | O'Connor et al. | |
| 8,601,536 B2 | 12/2013 | Liu et al. | |
| 8,627,032 B2 | 1/2014 | Zbiciak | |
| 8,806,654 B2 | 8/2014 | Thanner et al. | |
| 2003/0221030 A1 | 11/2003 | Pontius et al. | |
| 2009/0138623 A1 | 5/2009 | Bosch et al. | |
| 2010/0057960 A1 | 3/2010 | Renno | |

(Continued)

FOREIGN PATENT DOCUMENTS

| | | |
|---|---|---|
| EP | 1571559 A1 | 9/2005 |
| GB | 2499287 | 8/2013 |

(Continued)

OTHER PUBLICATIONS

Great Britain Search Report issued for GB Patent Application Serial No. 1503670.0 mailed Aug. 24, 2015, 4 pages.

*Primary Examiner* — Saleh Najjar
*Assistant Examiner* — Oleg Korsak
(74) *Attorney, Agent, or Firm* — Patent Capital Group

(57) ABSTRACT

A security-aware master is provided, such that a master can determine its security state before attempting access to secure resources or before requesting secure access level. An exemplary system include a system interconnect; one or more masters coupled with the system interconnect; and a master security check register coupled with the system interconnect. The master security check register is configured to receive a request from a master via the system interconnect to access the master security check register, wherein the request includes a master operating state signal that indicates a security state of the master requesting access, and return a data value to the master based on the master operating state signal, wherein the data value indicates a current security state of the master requesting access.

20 Claims, 4 Drawing Sheets

(56) References Cited

U.S. PATENT DOCUMENTS

| | | |
|---|---|---|
| 2012/0036299 A1 | 2/2012 | Renno |
| 2013/0031290 A1 | 1/2013 | Schwartz et al. |
| 2013/0047250 A1 | 2/2013 | Kothari |
| 2014/0366131 A1 | 12/2014 | Lai |

FOREIGN PATENT DOCUMENTS

| | | |
|---|---|---|
| GB | 2501470 | 10/2013 |
| GB | 2525484 | 10/2015 |
| WO | 03/077085 A1 | 9/2003 |
| WO | 2014/199118 | 12/2014 |

* cited by examiner

SYSTEM AND METHOD FOR SECURITY-AWARE MASTER

TECHNICAL FIELD

The present disclosure relates generally to secure processing environments, and more particularly, to systems and methods for providing security-aware processing components.

BACKGROUND

A processing system can include multiple masters that share slaves (or peripherals). To provide a secure processing environment, the processing system often implements a security mechanism that enables each master to access resources depending on its security state. For example, a security mechanism can allow a master operating in a secure state to access secure and non-secure resources, while allowing a master operating in a non-secure state to access only non-secure resources. A master is typically unaware of its operating state, such that the master may attempt to access secure resources even when operating in a non-secure state. The security mechanism blocks such attempt and then notifies the master that an error occurred while attempting to access the secure resources. The master can then take action to resolve the error. Although existing security mechanisms have been generally adequate for their intended purposes, they have not been entirely satisfactory in all respects.

BRIEF DESCRIPTION OF DRAWINGS

The present disclosure is best understood from the following detailed description when read with the accompanying figures. It is emphasized that, in accordance with the standard practice in the industry, various features are not drawn to scale and are used for illustration purposes only. In fact, the dimension of the various features may be arbitrarily increased or reduced for clarity of discussion.

OVERVIEW OF EXAMPLE EMBODIMENTS

Figure 1:
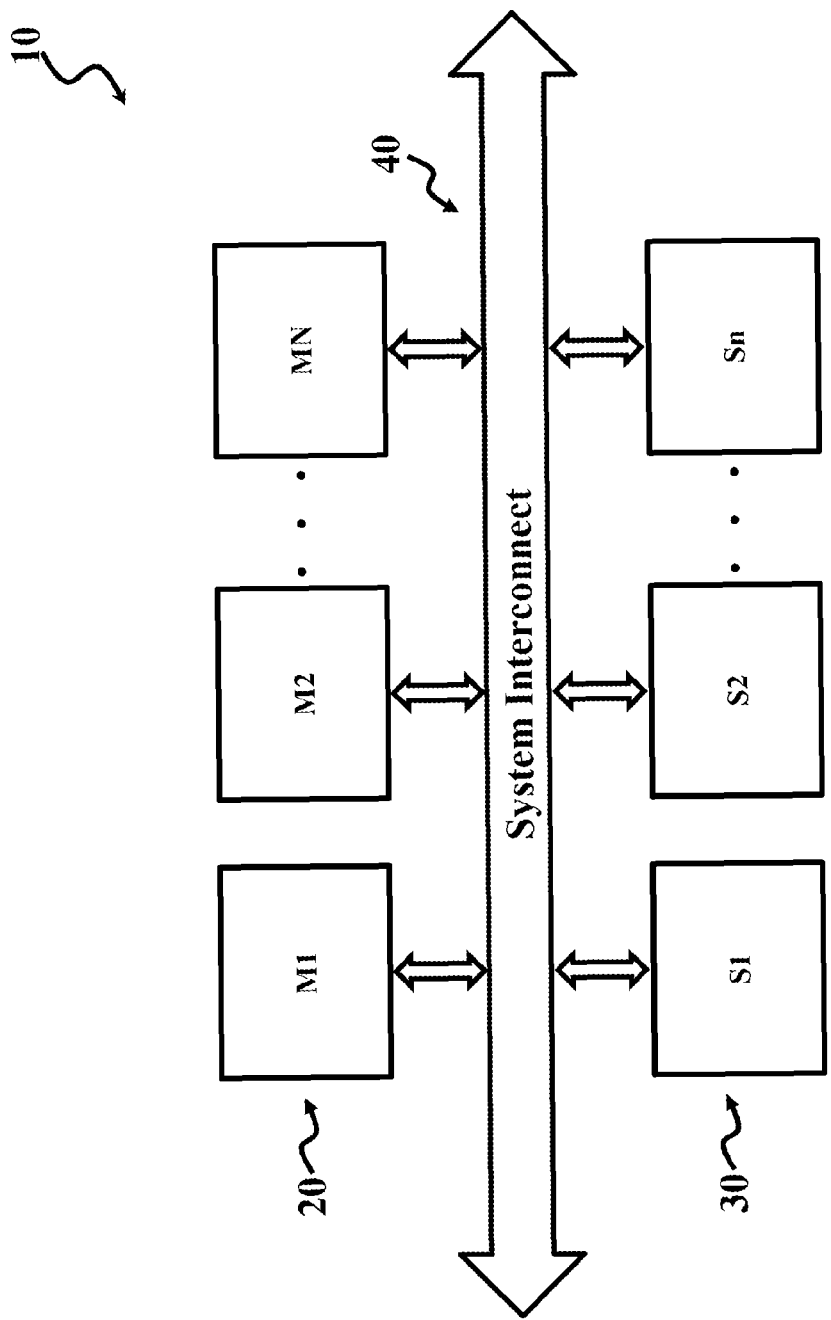
FIG. 1 is a schematic block diagram of an exemplary processing system for providing a secure processing environment according to various aspects of the present disclosure.

A system for enabling an endpoint to check its operating state and associated methods are described herein. In various implementations, the system can include a system interconnect with one or more masters, one or more slaves, and a master security check register coupled thereto. The master security check register can store data indicating a security state of any master accessing the master security check register. For example, in various implementations, the master security check register is configured to receive a request from a master via the system interconnect to access the master security check register. The request includes a master operating state signal that indicates a security state of the master requesting access, and the master security check register is further configured to return a data value to the master based on the master operating state signal, wherein the data value indicates a current security state of the master requesting access. The system can be configured so that no error signal is generated when the master requesting access to the master security check register is operating in a non-secure state. The master security check register may have a fixed address space.

In various implementations, the master operating state signal can indicate a secure state or a non-secure state, where the master security check register can return a first data value when the master operating state signal indicates the secure state and a second data value when the master operating state signal indicates the non-secure state. In various implementations, the master operating state signal can indicate a security mode of the master accessing the master security check register, and the master security check register can return a data value indicating the security mode of the master accessing the master security check register. Upon receiving a data value from the master security check register that indicates that the master is operating in a secure state, the master can access the slave. In various implementations, the master can access the slave without security error. Upon receiving a data value from the master security check register that indicates that the master is operating in a non-secure state, the master can request secure status.

In various implementations, the system includes a system protection unit configured to protect resources of the system from errant accesses. The system protection unit can include the master security check register, and in various implementations, the system protection unit is configured between the master and the slave, such that any access to the slave from the master is gated by the system protection unit.

DETAILED DESCRIPTION OF EXAMPLE EMBODIMENTS

A processing system can include multiple masters that share slaves (or peripherals). To provide a secure processing environment, the processing system often implements a security mechanism that enables each master to access resources of the slaves depending on its security state. The security mechanism can vary depending on the processing system's security model. In a core-centric security model, processing system components typically have well-defined, static security states. For example, only specified masters (such as core processors) transition between a secure state and a non-secure state, while other masters statically operate in either a secure state or a non-secure state, and/or resources are statically defined as secure resources or non-secure resources. Such security model provides a well-defined security mechanism that can allow a master operating in a secure state to access secure and non-secure resources, while allowing a master operating in a non-secure state to access only non-secure resources. In contrast, in a distributed security model, processing system components have dynamic security states. For example, various masters (for example, other than core processors) can transition between a secure state and a non-secure state, such that various masters can affect contents of secure resources, and resources can transition between secure and non-secure. Such security model can implement a security controller that controls and monitors operating states of the masters and resources, thereby ensuring system integrity.

In any secure processing environment, a master is typically unaware of its operating state. As such, the master may attempt to access secure resources when operating in a non-secure state, or attempt to access secure resources in an operating mode that is insufficient to access certain resource. A security mechanism will block such attempt and then notify the master that an error occurred while attempting to access the secure resources. In various implementations, for example, the processing system may assert a master bus error interrupt, while the master receives an error response associated with the master bus error interrupt. The master is then tasked with resolving what caused the error response. Such error response resolution can require significant processing overhead.

The following disclosure provides a security mechanism that enables a master within a processing system to check its operating state. For example, the master can check its security state (or mode) before attempting to access secure resources and/or before requesting a secure access level (or mode). The security mechanism and processing system configurations described herein can enhance secure processing environments, while significantly reducing processing overhead. Different embodiments may have different advantages, and no particular advantage is necessarily required of any of the embodiments described herein.

FIG. 1 is a schematic block diagram of an exemplary processing system 10 for providing a secure processing environment according to various aspects of the present disclosure. In various implementations, processing system 10 is implemented as a system-on-chip (SOC), such that components of processing system 10 are integrated in a single chip. In various implementations, components of processing system 10 are implemented in a same device. Alternatively, components of processing system 10 can be distributed in various integrated circuits and/or devices interconnected with each other, such that components of processing system 10 are integrated to provide a secure processing environment. FIG. 1 has been simplified for the sake of clarity to better understand the inventive concepts of the present disclosure. Additional features can be added in processing system 10, and some of the features described can be replaced or eliminated in other embodiments of processing system 10.

Processing system 10 includes masters 20, such as M1, M2, . . . MN (where N is a total number of masters), and slaves 30, such as S1, S2, . . . Sn (where n is a total number of slaves). In various implementations, slaves 30 are shared resources in processing system 10, where each of the masters 20 can access resources of the slaves 30. Masters 20 include any processing system component that can initiate a bus transaction, such as a central processing unit (CPU), a microcontroller, a microprocessor, a digital signal processor, a direct memory access (DMA) module, a system debug unit module, or other interconnect or system bus master. Slaves 30 include any processing component activated by a bus transaction, such as a memory, a controller (such as a memory controller), an input/output (I/O) module (any type of device that receives or provides information to processing system 10), a peripheral, or other interconnect or system bus slave. Memory can include a flash memory, a random access memory (RAM), a read only memory (ROM), a dynamic RAM (DRAM), a static RAM (SRAM), a synchronous DRAM (SDRAM), a double data rate SDRAM (DDR SDRAM), a graphic DDR memory, a magnetoresistive RAM (MRAM), other type of memory, or combination thereof. In various implementations, a processing component can act as both a master and a slave. Note that processing system 10 can include any number of masters (one or more) and/or slaves (one or more) depending on design requirements of processing system 10.

A system interconnect 40 interconnects various components of processing system 10. For example, in the depicted embodiment, masters 20 and slaves 30 are coupled to system interconnect 40, such that masters 20 and slaves 30 can communicate with one another via the system interconnect 40. System interconnect 40 can include a single bus, multiple buses, a crossbar network, a single-stage network, a multi-stage network, other type of interconnection network, or combination thereof. In various implementations, system interconnect 40 can implement system crossbars (SCB) that form a switch-fabric style for system bus interconnection. For example, SCBs can connect system bus masters (such as masters 20) to system bus slaves (such as slaves 30) to provide concurrent data transfer between multiple bus masters and multiple bus slaves. The switch-fabric can include a matrix including multiple master interfaces and multiple slave interfaces.

During operation of processing system 10, each of masters 20 has an associated operating state (mode), such as a secure state, a non-secure state, or state with a varying security level (for example, a user mode where the master has restricted access to certain resources in processing system 10, a supervisor mode where the master has unrestricted access to resources of processing system 10, other mode, or combination thereof). At least one of the masters 20 can transition between various operating states (modes). In some implementations, a master operates in a secure state where the master can access secure and non-secure resources or a non-secure state where the master can access non-secure resources, but not secure resources. As noted above, masters 20 include any processing system component that can initiate a bus transaction, such that processing system components other than a core processor of processing system 10 can affect system resources, such as resources provided by slaves 30. Furthermore, slaves 30 can include secure resources, non-secure resources, or both secure and non-secure resources. In some implementations, resources of processing system 10 and/or slaves 30 can transition between secure and non-secure. Accordingly, processing system 10 implements a distributed security model, where masters 20 and slaves 30 have associated dynamic security states.

Figure 2:
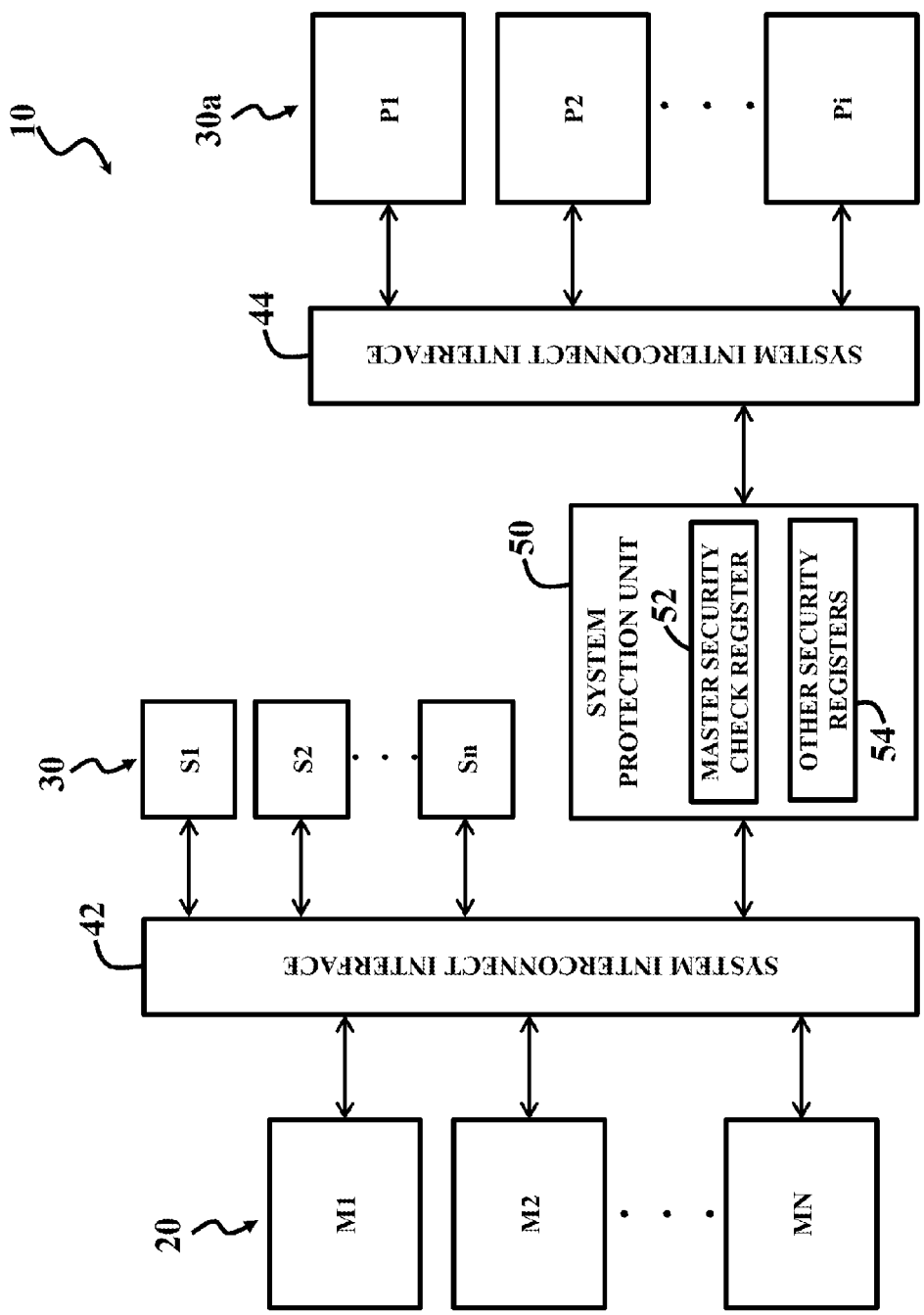
FIG. 2 is a schematic block diagram of an exemplary security mechanism that supports a security-aware master, which can be implemented by the processing system of FIG. 1, according to various aspects of the present disclosure.

FIG. 2 is a schematic block diagram of an exemplary security mechanism that supports security-aware masters that can be implemented by processing system 10 of FIG. 1 according to various aspects of the present disclosure. FIG. 2 has been simplified for the sake of clarity to better understand the inventive concepts of the present disclosure. Additional features can be added in the security mechanism implemented by processing system 10, and some of the features described can be replaced or eliminated in other embodiments of the security mechanism implemented by processing system 10.

In FIG. 2, slaves 30 further include slaves 30a having associated memory-mapped register space, such as peripherals P1, P2, . . . Pi (where i is a total number of peripherals). In the depicted embodiment, system interconnect 40 includes a system interconnect interface 42 and a system interconnect interface 44, where masters 20 can communicate with slaves 30 via system interconnect interface 42, and masters 20 can communicate with slaves 30a via system interconnect interface 42 and system interconnect interface 44 (in some implementations, representative of a system memory-mapped (SMMR) interface).

A system protection unit (SPU) 50 is configured to protect resources of processing system 10 from errant accesses. For example, SPU 50 includes a set of registers, such as a master security check register 52 and other security registers 54. In the depicted embodiment, SPU 50 is configured between system interconnect interface 42 and system interconnect interface 44 (for example, a SMMR interface), such that any access to any slave 30a from any master 20 comes through system interconnect interface 42 and is gated by the SPU.

Master security check register 52 is configured to store data indicating an operating state of any master 20 accessing master security check register 52, such that any master 20 can check its security status. In the depicted embodiment, master security check register 52 has a fixed location (for example, a fixed address space). For example, a master can issue a register access request to master security check register 52 via system interconnect 40 (here, via system interconnect interface 42). System interconnect 40 includes signaling that carries information about an operating state of the master issuing the register access request. For example, a master operating state signal accompanies the register access request, indicating a current security state of the master accessing (for example, reading) the master security check register 52. In various implementations, the master operating state signal indicates that the master accessing the master security check register 52 is operating in a secure state or a non-secure state. In various implementations, the master operating state signal indicates a security mode or level of the master accessing the master security check register 52, such as a user mode, a supervisor mode, other mode, or combination thereof. Based on the master operating state signal, master security check register 52 returns a data value to the master that indicates the current security state of the master. For example, master security check register 52 can return one of two values to the master—a data value that indicates that the master is in a secure state or a data value that indicates that the master is in a non-secure state. In various implementations, master security check register 52 can return a data value that indicates a security mode (level) of the master accessing the master security check register, such as a data value that indicates a user mode, a supervisor mode, or some other security mode.

Figure 3:
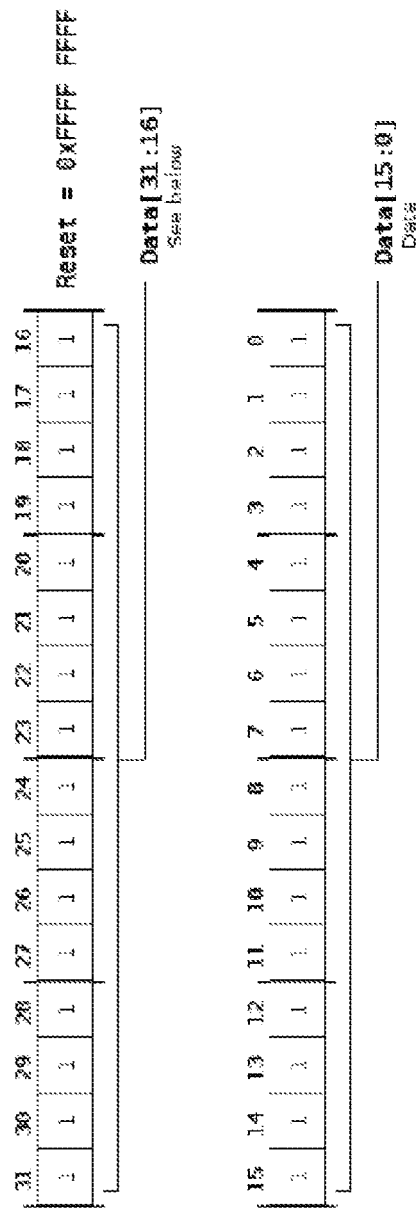
FIG. 3 is an exemplary master security check register that can be implemented in the security mechanism of FIG. 2 according to various aspects of the present disclosure.

FIG. 3 is an exemplary master security check register 60 that can be implemented in the security mechanism of FIG. 2 according to various aspects of the present disclosure. In FIG. 3, master security check register 60 is a 32-bit register. Alternatively, master security check register 60 can have a different size. Master security check register 60 returns a data value of 0xFFFFFFFF when accessed (for example, read) by a secure master and a data value of 0x00000000 when accessed by a non-secure master. In various implementations, master security check register 60 can be configured to return different data values when accessed by a secure master and/or a non-secure master, and/or further configured to return data values that indicate a security mode or level of the master accessing the master security check register 60. FIG. 3 has been simplified for the sake of clarity to better understand the inventive concepts of the present disclosure. Additional features can be added in master security check register 60, and some of the features described can be replaced or eliminated in other embodiments of master security check register 60.

Returning to FIG. 2, master security check register 52 is configured to allow any master 20 in any operating mode access to check its operating state and provide a data value indicating a current operating state of the master accessing. Accordingly, such configuration can eliminate the need for generating an error signal and/or associated master bus error interrupt. Instead, since access to master security check register will not be rejected, a master can initiate a security check transaction without potential for an error signal and/or associated master bus error interrupt. The security check transaction itself provides the master security check register 52 (and/or SPU 50) an indication of the current state of the security check transaction, such that the master security check register 52 (and/or SPU 50) can determine the requesting master's operating state. Where the master discovers that it is operating in a non-secure state or an unsatisfactory security mode, the master can move forward with requesting secure states. Where the master discovers that it is operating in a secure state or satisfactory security mode, the master can move forward with requesting access to resources of processing system 10, such as access to secure resources of slaves 30 and/or slaves 30a.

Alternatively, in various implementations, each master has an associated master security check register, where a master accesses its associated master security check register to determine its current operating state. In yet another alternative, in various implementations, the master security check register includes current operating state information about each master of processing system 10. In yet other implementations, system protection unit 50 can be omitted from processing system 10, such that master security check register 52 is configured elsewhere in processing system 10. The present disclosure contemplates other configurations to enable the security-aware masters described herein.

Other security registers 54 can include a global lock register, a write protection register, other security registers, any other register configured to protect resources of processing system 10, or a combination thereof. In various implementations, SPU 50 has global locking capability. For example, SPU 50 can include a global locking register allowing SPU 50 to prevent access to multiple slaves 30a, such as peripherals P1, P2, . . . Pi, associated control register. Enabling the global locking register can activate a global lock signal, such that when a lock enable portion of a peripheral's associated control register is set and the global lock signal is recognized, the peripheral blocks further access to its control register. In various implementations, SPU 50 has write-protection registers associated with each slave 30a, such as a write-protection register associated with each peripheral P1, P2, . . . Pi. Each write-protection register is configured to control what masters 20 can access its associated peripheral register set. In various implementations, each write-protection register has a portion (for example, one or more bits) that corresponds to each of masters 20, such that SPU 50 can block access attempts of masters 20. When the portion corresponding with a particular master is set (for example, when corresponding bits are set), SPU 50 blocks the particular master's access to the associated peripheral's register set, such that the particular master is locked out from accessing the peripheral.

Figures 4A, 4B:
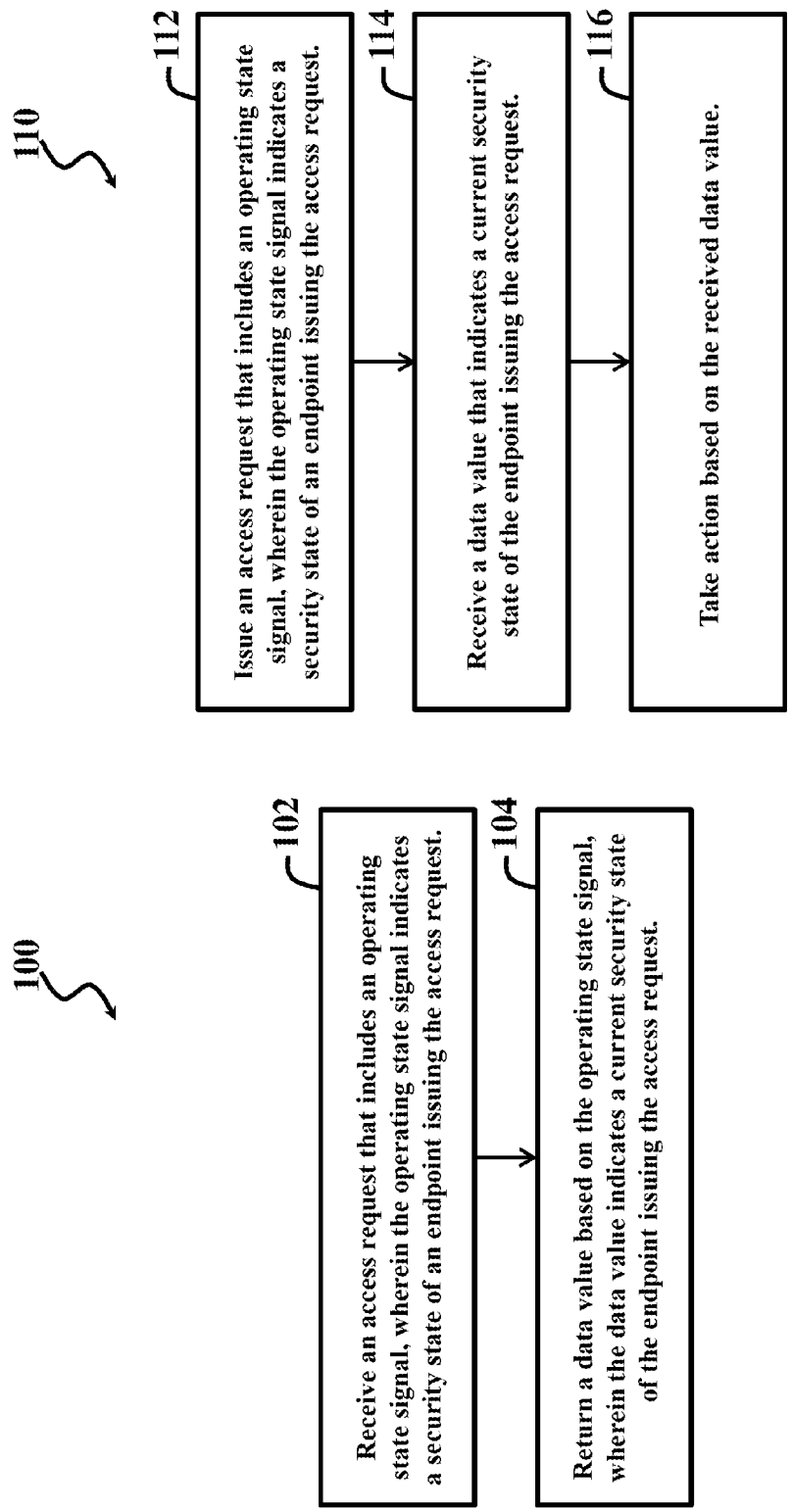
FIG. 4A and FIG. 4B are flowcharts of exemplary methods for supporting a security-aware endpoint of a processing system, such as the processing system described with reference to FIG. 1, FIG. 2, and FIG. 3, according to various aspects of the present disclosure.

FIG. 4A is a flowchart of an exemplary method 100 for supporting a security-aware endpoint of a processing system, such as the processing system described with reference to FIG. 1, FIG. 2, and FIG. 3, according to various aspects of the present disclosure. In various implementations, the security-aware endpoint is a master of a processing system, and a master security check register, such as master security check register 52 described above, implements method 100. At block 102, an access request is received from an endpoint in a processing system. An operating state signal accompanies the access request, indicating a security state of the endpoint issuing the access request. For example, master security check register receives an access request, such as a read request, from a master of a processing system, and the access request includes a master operating state signal that indicates a security state of the master issuing the access request. At block 104, a data value is returned to the endpoint based on the operating state signal. The data value indicates a current security state of the endpoint issuing the access request. For example, master security check register can return one of two values to the master—a data value that indicates that the master is in a secure state or a data value that indicates that the master is in a non-secure state. In various implementations, master security check register can return a data value that indicates a security mode (level) of the endpoint accessing the master security check register, such as a data value that indicates a user mode, a supervisor mode, or some other security mode. Additional steps can be provided before, during, and after method 100 and some of the steps described can be replaced or eliminated for other embodiments of method 100. Furthermore, the present disclosure contemplates that the endpoint can include any processing component of the processing system.

FIG. 4B is a flowchart of an exemplary method 110 for supporting a security-aware endpoint of a processing system, such as the processing system described with reference to FIG. 1, FIG. 2, and FIG. 3, according to various aspects of the present disclosure. In various implementations, the security-aware endpoint, such as a master of a processing system, implements method 110. At block 112, the endpoint issues an access request to check its security status. An operating state signal accompanies the access request, indicating a security state of the endpoint issuing the access request. For example, a master of a processing system issues an access request, such as a read request, to check its security status, and the access request includes a master operating state signal that indicates a security state of the master. In various implementations, the master issues the access request to a master security check register. At block 114, the endpoint receives a data value that indicates its current security state. For example, the master receives a data value that indicates that it is operating in a secure state or a data value that indicates it is operating in a non-secure state. In various implementations, the master receives a data value that indicates a security mode (level) of the endpoint, such as user mode, supervisor mode, or some other security mode. At block 116, the endpoint takes action based on the received data value. For example, upon receiving a data value that indicates that the master is operating in a secure state, the master can access secure resources. Upon receiving a data value that indicates that the master is operating in a non-secure state, the master can request secure status. In another example, upon receiving a data value that indicates the master's security mode (level), the master can perform processing functions consistent with its security mode (level) and/or request a change in its security mode (level) before performing further processing functions. Additional steps can be provided before, during, and after method 110 and some of the steps described can be replaced or eliminated for other embodiments of method 110. Furthermore, the present disclosure contemplates that the endpoint can include any processing component of the processing system.

In various implementations, processing system 10, components of processing system 10, and/or the various circuits and/or components of the FIGURES can be implemented on a board of an associated electronic device. The board can be a general circuit board that can hold various components of an internal electronic system of the electronic device and, further, provide connectors for other peripherals. The board can provide the electrical connections by which the other components of the system can communicate electrically. Any suitable processors (inclusive of digital signal processors, microprocessors, supporting chipsets, etc.), memory elements, etc. can be suitably coupled to the board based on particular configuration needs, processing demands, computer designs, other considerations, or a combination thereof. Other components, such as external storage, sensors, controllers for audio/video display, and peripheral devices may be attached to the board as plug-in cards, via cables, or integrated into the board itself. In various implementations, processing system 10, components of processing system 10, and/or the various the circuits and/or components of the FIGURES can be implemented as stand-alone modules (for example, a device with associated components and circuitry configured to perform a specific application or function) or implemented as plug-in modules into application specific hardware of electronic devices. Note that particular embodiments of the present disclosure may be readily included in a system-on-chip (SOC) package, either in part, or in whole. An SOC represents an integrated circuit that integrates components of a computer or other electronic system into a single chip. It may contain digital, analog, mixed-signal, and often radio frequency functions: all of which may be provided on a single chip substrate. Other embodiments may include a multi-chip-module (MCM), with a plurality of separate ICs located within a single electronic package and configured to interact closely with each other through the electronic package. In various other embodiments, the various functions described herein may be implemented in one or more semiconductor cores (such as silicon cores) in application specific integrated circuits (ASICs), field programmable gate arrays (FPGAs), other semiconductor chips, or combinations thereof.

The various functions outlined herein may be implemented by logic encoded in one or more non-transitory and/or tangible media (for example, embedded logic provided in an application specific integrated circuit (ASIC), as digital signal processor (DSP) instructions, software (potentially inclusive of object code and source code) to be executed by a processor, or other similar machine, etc.). In some of these instances, a memory element can store data used for the operations described herein. This includes the memory element being able to store logic (for example, software, code, processor instructions) that is executed by a processor to carry out the activities described herein. The processor can execute any type of instructions associated with the data to achieve the operations detailed herein. In various implementations, the processor can transform an element or an article (such as data) from one state or thing to another state or thing. In another example, the activities outlined herein may be implemented with fixed logic or programmable logic (such as software/computer instructions executed by the processor) and the elements identified herein can be some type of a programmable processor (such as a DSP), programmable digital logic (e.g., a FPGA, an erasable programmable read only memory (EPROM), an electrically erasable programmable ROM (EEPROM)), or an ASIC that includes digital logic, software, code, electronic instructions, or any suitable combination thereof.

Note that the activities discussed above with reference to the FIGURES are applicable to any integrated circuits that involve signal processing, particularly those that can execute specialized software programs or algorithms, some of which may be associated with processing digitized real-time data. Certain embodiments can relate to multi-DSP signal processing, floating point processing, signal/control processing, fixed-function processing, microcontroller applications, etc. In certain contexts, the features discussed herein can be applicable to medical systems, scientific instrumentation, wireless and wired communications, radar, industrial process control, audio and video equipment, current sensing, instrumentation (which can be highly precise), and other digital-processing-based systems. Moreover, certain embodiments discussed above can be provisioned in digital signal processing technologies for medical imaging, patient monitoring, medical instrumentation, and home healthcare. This could include pulmonary monitors, accelerometers, heart rate monitors, pacemakers, etc. Other applications can involve automotive technologies for safety systems (e.g., stability control systems, driver assistance systems, braking systems, infotainment and interior applications of any kind). Furthermore, powertrain systems (for example, in hybrid and electric vehicles) can use high-precision data conversion products in battery monitoring, control systems, reporting controls, maintenance activities, etc. In yet other example scenarios, the teachings of the present disclosure can be applicable in the industrial markets that include process control systems that help drive productivity, energy efficiency, and reliability. In consumer applications, the teachings of the signal processing circuits discussed above can be used for image processing, auto focus, and image stabilization (e.g., for digital still cameras, camcorders, etc.). Other consumer applications can include audio and video processors for home theater systems, DVD recorders, and high-definition televisions. Yet other consumer applications can involve advanced touch screen controllers (e.g., for any type of portable media device). Hence, such technologies could readily be a part of smartphones, tablets, security systems, PCs, gaming technologies, virtual reality, simulation training, etc.

The specifications, dimensions, and relationships outlined herein have only been offered for purposes of example and teaching only. Each of these may be varied considerably without departing from the spirit of the present disclosure, or the scope of the appended claims. The specifications apply only to non-limiting examples and, accordingly, they should be construed as such. In the foregoing description, example embodiments have been described with reference to particular processor and/or component arrangements. Various modifications and changes may be made to such embodiments without departing from the scope of the appended claims. The description and drawings are, accordingly, to be regarded in an illustrative rather than a restrictive sense.

Note that with the numerous examples provided herein, interaction may be described in terms of two, three, four, or more processing components. However, this has been done for purposes of clarity and example only. It should be appreciated that the system can be consolidated in any suitable manner. Along similar design alternatives, any of the illustrated components, modules, circuits, and elements of the FIGURES may be combined in various possible configurations, all of which are clearly within the broad scope of this Specification. In certain cases, it may be easier to describe one or more of the functionalities of a given set of flows by only referencing a limited number of processing components. It should be appreciated that the processing components of the FIGURES and its teachings are readily scalable and can accommodate a large number of components, as well as more complicated/sophisticated arrangements and configurations. Accordingly, the examples provided should not limit the scope or inhibit the broad teachings of the processing system and/or components as potentially applied to a myriad of other architectures.

Further, note that references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. It is further noted that "coupled to" and "coupled with" are used interchangeably herein, and that references to a feature "coupled to" or "coupled with" another feature include any communicative coupling means, electrical coupling means, mechanical coupling means, other coupling means, or a combination thereof that facilitates the feature functionalities and operations, such as the security check mechanisms, described herein.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "steps for" are specifically used in the particular claims; and (b) does not intend, by any statement in the specification, to limit this disclosure in any way that is not otherwise reflected in the appended claims.

OTHER NOTES, EXAMPLES, AND IMPLEMENTATIONS

In various implementations, a system is provided. The system can include means for receiving a request from a master to access a master security check register, wherein the request includes a master operating state signal that indicates a security state of the master requesting access, and means for returning a data value to the master based on the master operating state signal, wherein the data value indicates a current security state of the master requesting access. The 'means for' in these instances can include (but is not limited to) using any suitable component discussed herein, along with any suitable software, circuitry, hub, computer code, logic, algorithms, hardware, controller, interface, link, bus, communication pathway, etc. In various implementations, the system includes memory that includes instructions that when executed cause the system to perform any of the activities discussed herein.

What is claimed is:

1. A system comprising:
    a system interconnect;
    one or more masters coupled with the system interconnect; and
    a master security check register coupled with the system interconnect, the master security check register configured to store data indicating a security state of any master accessing the master security check register, the master security check register further configured to:
        receive a request from a master via the system interconnect to access the master security check register, wherein the request includes a master operating state signal that indicates a security state of the master requesting access, and
        return a data value to the master based on the master operating state signal, wherein the data value indicates a current security state of the master requesting access.

2. The system of claim 1, wherein the master operating state signal indicates a secure state or a non-secure state, wherein the master security check register is configured to:
    return a first data value when the master operating state signal indicates the master accessing the master security check register is in a secure state; and return a second data value when the master operating state signal indicates the master accessing the master security check register is in a non-secure state.

3. The system of claim 1, wherein:

the master operating state signal indicates a security mode of the master accessing the master security check register; and the master security check register is configured to return a data value indicating the security mode of the master accessing the master security check register.

4. The system of claim 1, further including a slave coupled with the system interconnect, wherein the system interconnect is configured to facilitate communication between the master and the slave, wherein the master is configured to access the slave upon receiving a data value from the master security check register that indicates that the master is operating in a secure state.

5. The system of claim 4, wherein the master is configured to request secure status upon receiving a data value from the master security check register that indicates that the master is operating in a non-secure state.

6. The system of claim 1, configured such that no error signal is generated when the master requesting access to the master security check register is operating in a non-secure state.

7. The system of claim 1, further including a system protection unit that includes the master security check register, wherein the system protection unit is configured to protect resources of the system from errant accesses.

8. The system of claim 7, further including a slave coupled with the system interconnect, wherein the system protection unit is configured between the master and the slave, such that any access to the slave from the master is gated by the system protection unit.

9. The system of claim 1, wherein the master security check register has a fixed address space.

10. A method comprising:

receiving a request from a master to access a master security check register, wherein the request includes a master operating state signal that indicates a security state of the master requesting access, and based on the master operating state signal, returning a data value to the master, wherein the data value indicates a current security state of the master requesting access.

11. The method of claim 10, wherein the master operating state signal indicates a secure state or a non-secure state, and the method further includes:

returning a first data value to the master when the master operating state signal indicates the master accessing the master security check register is in a secure state; and returning a second data value to the master when the master operating state signal indicates the master accessing the master security check register is in a non-secure state.

12. The method of claim 10, wherein the master operating state signal indicates a security mode, and the method further includes returning a data value indicating the security mode of the master accessing the master security check register.

13. The method of claim 10 further including accessing, by the master, a slave upon receiving a data value from the master security check register that indicates that the master is operating in a secure state.

14. The method of claim 13 further comprising requesting, by the master, secure status upon receiving a data value from the master security check register that indicates that the master is operating in a non-secure state.

15. The method of claim 10, wherein no error signal is generated when the master requesting access to the master security check register is operating in a non-secure state.

16. A non-transitory media encoded with logic that includes code for execution and, when executed by a processor, operable to perform operations comprising:

receiving a request from a master to access a master security check register, wherein the request includes a master operating state signal that indicates a security state of the master requesting access, and based on the master operating state signal, returning a data value to the master, wherein the data value indicates a current security state of the master requesting access.

17. The non-transitory media of claim 16, wherein the master operating state signal indicates a secure state or a non-secure state, and the operations further include:

returning a first data value to the master when the master operating state signal indicates the master accessing the master security check register is in a secure state; and returning a second data value to the master when the master operating state signal indicates the master accessing the master security check register is in a non-secure state.

18. The non-transitory media of claim 16, wherein the master operating state signal indicates a security mode, and the operations further include returning a data value indicating the security mode of the master accessing the master security check register.

19. The non-transitory media of claim 16, the operations further including accessing, by the master, a slave upon receiving a data value from the master security check register that indicates that the master is operating in a secure state.

20. The non-transitory media of claim 19, the operations further including requesting, by the master, secure status upon receiving a data value from the master security check register that indicates that the master is operating in a non-secure state.

* * * * *